Feb. 6, 1940.          J. G. FORD                2,189,632
                       BUSHING
                 Filed Jan. 13, 1938
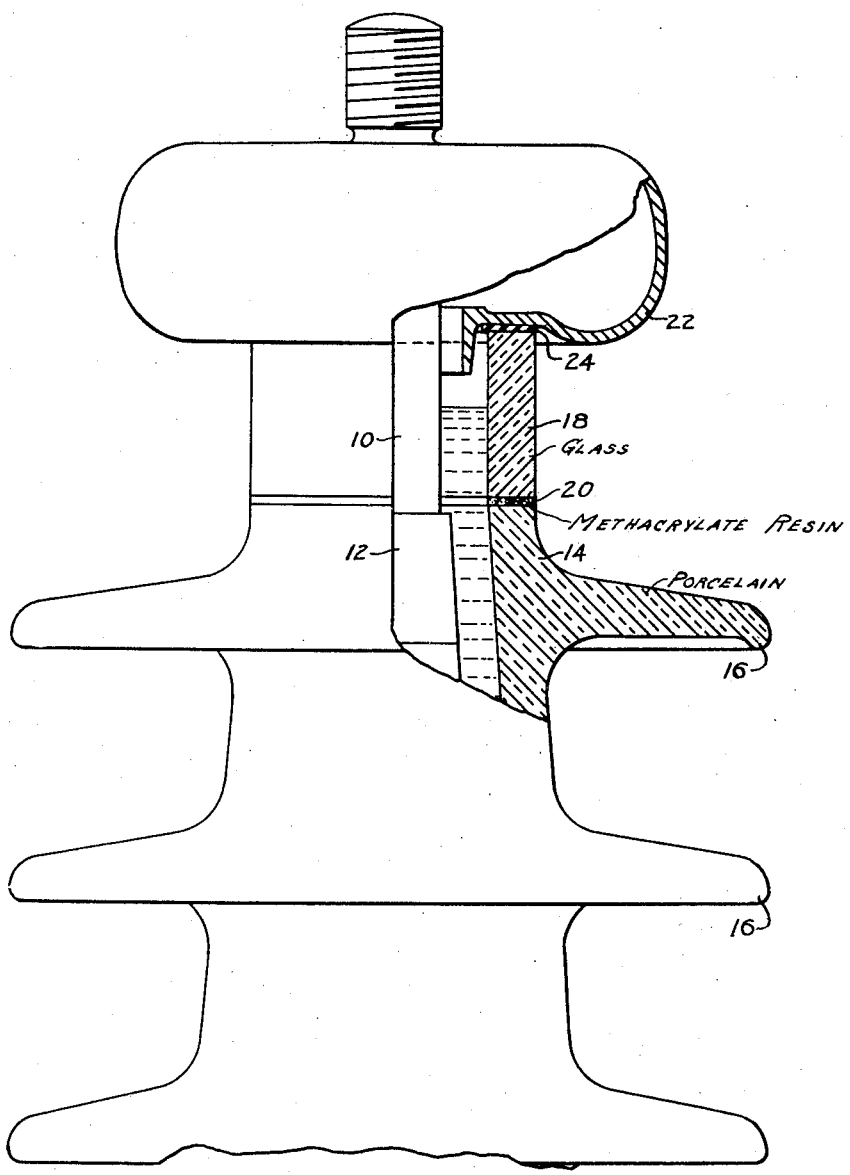
WITNESSES:                           INVENTOR
                                     James G. Ford.
                                  BY
                                     ATTORNEY Patented Feb. 6, 1940

2,189,632

UNITED STATES PATENT OFFICE 2,189,632

BUSHING

James G. Ford, Forest Hills, Pa., assignor to Westinghouse Electric & Manufacturing Company, East Pittsburgh, Pa., a corporation of Pennsylvania Application January 13, 1938, Serial No. 184,832

4 Claims. (Cl. 174—11)

This invention relates to bushings of the same general type as disclosed in Edwin E. Arnold's copending application Serial No. 184,830, filed January 13, 1938, entitled "Bushing" and assigned to the same assignee as this invention.

In bushings and particularly condenser bushings, oil or other suitable dielectric medium is employed between the conductor or condenser proper and the dielectric tube weather casing which is disposed in spaced relation thereto. Since it is desirable to have a visual indication of the heighth of the oil within the bushing, glass cylinder sight gauges are employed above the dielectric tube weather casings.

As it is not desired to change the length of the bushing for a given rating, the dielectric tube is usually shortened an amount sufficient to accommodate the glass gauge employed. The bond between the glass gauge and the dielectric tube weather casing is thus below the level of the oil within the bushing and to be satisfactory must have the characteristics of being resistant to oil and moisture and be leak-proof.

An object of this invention is the provision of a bushing having a sealed and leak-proof weather casing.

Another object of this invention is the provision of a bushing having thermoplastic sealed joints in the weather casing.

A more specific object of this invention is the provision of a bushing including a glass gauge visual indicator and a dielectric tube as a weather casing which is sealed into an integral leak-proof structure by methacrylate resin.

Other objects of this invention will become apparent from the following description, when taken in conjunction with the accompanying drawing, the single figure of which is a view in elevation and partly in section of a portion of the bushing constructed in accordance with this invention.

Referring to the drawing, the electrical apparatus with which the bushing is to be associated includes a tubular conductor 10 which is wrapped with alternate layers of conducting and insulating material to constitute a condenser type of bushing 12. The lower portion of the condenser bushing 12 and the tank of the immersed apparatus with which the bushing is to be employed, are not illustrated, since they do not form a part of this invention.

The exposed end of the conductor and condenser bushing 12 are enclosed by a dielectric tube member or weather casing 14 of some suitable material, such as porcelain, disposed in spaced relation to the conductor. The dielectric tube 14 carries a plurality of radial creepage flanges 16 in accordance with the usual practice.

In order to provide a visual indicator whereby the heighth of the insulating fluid within the casing may be readily ascertained, a cylindrical shell 18 of transparent material, such as glass, is provided for seating in alignment on the end of the dielectric tube 14. Since the joint between the glass gauge 18 and the dielectric tube 14 is below the level of the oil within the bushing, it is necessary to so seal the joint therebetween that it is unaffected by the stresses encountered during operation and the stresses due to the relatively different expansion characteristics of the glass and dielectric tube.

In order to seal the joint between the glass gauge and the dielectric tube, a thermoplastic material, which is resistant to oil and moisture, and which will adhere to both the glass and porcelain of the weather casing, is employed. Methacrylate resin is satisfactory for this purpose.

In making the seal, methyl methacrylate resin is molded into the form of a gasket 20 having a size suitable for fitting on the end of a dielectric tube. The methyl methacrylate resin is obtainable as a plasticized or unplasticized powder which, when subjected to sufficient heat and pressure, such as a temperature of about 165–175° C., and a pressure of up to 40 tons per square inch, is converted to a hard, clear tough and solid form.

The plasticized resin is considerably softer than the unplasticized resin as evidenced in tests made on gaskets of both forms. In order to test these gaskets they are subjected to a pressure of about 500 pounds per square inch at different temperatures, while the flow of the gasket is measured by means of a travelling microscope which will measure the variation in thickness of the gasket with an accuracy of .01 mm. From these tests, it is found that gaskets of the plasticized resin .77 mm. thick, when subjected to a temperature of 75° C. for a period of time of 133 hours, is reduced in thickness 19.5%, whereas gaskets of the unplasticized or hard resin .8 mm. thick, when subjected to a temperature of 78° C., is reduced in thickness only about 1.25% during the first 24 hours without being further affected by the continued application of the heat at that temperature. Similar results are obtained when the thermoplastic material is subjected to higher temperatures. Since the unplasticized methyl methacrylate is the least affected by temperatures, it is to be preferred.

Since the molded gasket is in the hard form, it is necessary to provide a bond which is satisfactory for sealing the gasket to both the glass and the porcelain. The bond must also be satisfactory for relieving the stresses set up between the gasket, glass and porcelain dielectric tube by reason of their different coefficient of expansion. A bond formed from a particular methacrylate resin is found to be sufficiently plastic to allow for the desired relief of the stresses set up in the joint. This bond is formed from propyl methacrylate dissolved in a suitable solvent. A bond comprising a 20% solution of the propyl methacrylate dissolved in a solution consisting of a mixture of 87% toluol and 13% isopropyl alcohol has the desired characteristics.

In order that the bond may adhere to the surfaces of the glass gauge, dielectric tube and gasket, it is necessary that the contacting surface be thoroughly cleaned of all oil and grease. These surfaces may be cleaned through the application of benzol or toluol thereto. After the surfaces of the dielectric tube, gasket and glass gauge are cleaned, the bond is applied thereto. The bond may be applied only to the surfaces of the gasket or, as desired, to each of the surfaces of the gasket, dielectric tube and glass gauge.

Since the bond contains considerable solvent which, if retained, will effect bubbles in the seal and give poor adhesion between the gasket, glass gauge and dielectric tube, it is necessary to completely remove the solvent from the bond. This may be accomplished either by air drying the bond coated gasket for from 15 to 30 minutes or longer where necessary or through the application of sufficient heat to cause the complete evaporation of solvent from the bond.

After the bond is dried to remove the solvent therefrom, the glass gauge and porcelain weather casing are assembled with the gasket of methyl methacrylate carrying the solvent-free bond therebetween and placed in a suitable clamp to apply a uniform pressure to the gasket. This pressure may vary from between 200 pounds to 500 pounds per square inch, depending upon the working temperature to which it is proposed to subject the assembly in operation.

With the assembly thus clamped, it is placed in an oven for a period of time of from 1 to 2 hours and subjected to a temperature of between 95° C. and 115° C. to soften the solvent free bond and cause it to flow and seal the gasket, dielectric tube and gauge into an integral structure. The temperature employed in making the seal depends upon the operating temperatures of the bushing, it being necessary that the sealing temperature be somewhat higher than the operating temperature to prevent softening and flowing of the thermoplastic seal under operating conditions at the lower temperature. The assembly is then removed from the oven and allowed to cool while maintaining a pressure on the assembly to prevent a splitting of the seal.

In testing the seals formed as hereinbefore described, it is found that when the assembly is subjected to a thermal shock-proof test consisting of heating the assembly without applying pressure to temperatures of between 80 and 90° F. and then quickly quenching it to a temperature of −50° F., the seal remains intact. Repeated thermal shocks of this nature do not affect the seal.

In mechanically testing the seals, the assembly is fastened at one end of the dielectric tube with a fulcrum under the tube near the seal and a force is applied to the glass at right angles to the axis of the assembly. In repeated mechanical tests of this type on different assemblies, it is found that either the dielectric tube or the glass gauge breaks while the seal remained intact. In one case, the dielectric tube broke when a force of 1650 pounds was applied to the glass while in another case the glass broke when a force of about 1550 pounds was applied to the glass.

In a modification of the seal, the bond is formed from a mixture of monomer methacrylate, polymer methacrylate and a common plasticizer such as dibutyl phthalate. After the gasket or the ends of the dielectric tube and glass gauge are coated with this bond, and the assembly is clamped under pressure, sufficient heat is applied to effect the polymerization of the bond.

After the glass cylinder and dielectric tube weather casing are integrally united by the seal of thermoplastic material, the assembly is disposed in spaced relation about the conductor and condenser bushing 12. In order to maintain the sealed weather casing in position with respect to the conductor, and to provide an expansion chamber between the conductor and the weather casing, a hollow chamber 22 is disposed about the end of the conductor and secured thereto for seating on the end of the glass cylinder. A gasket 24 of any suitable material is disposed between the end of the glass cylinder and the bottom of the hollow chamber 22 for effecting a sealed joint therebetween.

In practice, the hollow expansion chamber may be of any suitable form so maintained in position about the conductor as to apply a compressive force to the gasket between the glass cylinder and the hollow chamber and maintain the integrally sealed glass cylinder, gasket and dielectric tube under compression. Specific details of the cap structure and the manner in which it is secured to the conductor 10 are not illustrated, since any of the well known expansion chamber structures and methods of securing them to maintain the weather casing under compression may be employed.

Bushings embodying this invention are entirely satisfactory under operating conditions in which the temperature encountered is not above the bonding temperature of the seal. Under abnormal, mechanical and thermal shock tests, the thermoplastic seal of methacrylate resin has proven to be stronger than the glass and porcelain materials which it bonds. The seal thus formed is hard and tough, being resistant to oil and moisture and if formed under sufficiently high temperatures, does not show excessive flow at maximum operating pressures and temperatures. In addition to being resistant to mechanical and thermal shocks, the structure thus produced is also resistant to stresses due to the difference in the coefficient of expansions of the materials employed, since the bond employed is sufficiently plastic to allow for relief of these stresses.

Although this invention has been described with reference to a particular embodiment thereof, it is, of course, not to be limited thereto except insofar as is necessitated by the prior art and the scope of the appended claims.

I claim as my invention:

1. A bushing comprising, in combination, a conductor, a dielectric tube member disposed in spaced relation about the conductor, a cylinder of transparent dielectric material disposed in spaced relation about the conductor in end to end relation with the dielectric tube, the cylinder and the dielectric tube member having different coefficients of expansion, a seal of methacrylate resin disposed between the dielectric tube and the cylinder adhering thereto and bonding the cylinder and the dielectric tube member into an integral structure, means associated with the unsealed end of the transparent cylinder and the conductor for closing the space therebetween, and means associated with the unsealed end of the dielectric tube member and the conductor for closing the space therebetween, said seal cooperating with the transparent cylinder and the dielectric tube member to provide a leakproof structure about the conductor, the seal being sufficiently plastic to relieve stresses in the sealed structure occasioned by reason of the different coefficients of expansion of the sealed elements while maintaining them integrally united.

2. A bushing comprising, in combination, a conductor, a dielectric tube member disposed in spaced relation about the conductor, a gasket of polymerized methyl methacrylate disposed on the end of the dielectric tube, a glass cylinder having a coefficient of expansion different from that of the dielectric tube member disposed in spaced relation about the conductor to seat on the gasket, a bond of thermoplastic material disposed between the gasket and each of the glass cylinder and the dielectric tube for sealing the gasket, glass cylinder and dielectric tube into an integral structure, means associated with the unsealed end of the glass cylinder and the conductor for closing the space therebetween, and means associated with the unsealed end of the dielectric tube member and the conductor for closing the space therebetween, said gasket and bond cooperating with the glass cylinder and the dielectric tube member to provide a leakproof structure about the conductor, the bond being resistant to mechanical and thermal shocks by reason of the thermoplastic material and also being sufficiently plastic for relieving stresses occasioned by reason of the different coefficients of expansion of the sealed elements.

3. A bushing comprising, in combination, a conductor, a dielectric tube member disposed in spaced relation about the conductor, a glass cylinder having a coefficient of expansion different from that of the dielectric tube member disposed in spaced relation about the conductor in end to end relation with the dielectric tube, a seal formed of a gasket of polymerized methyl methacrylate having a coating comprising propyl methacrylate disposed between the dielectric tube and the glass cylinder bonding them into an integral structure, means associated with the unsealed end of the glass cylinder and the conductor for closing the space therebetween, and means associated with the unsealed end of the dielectric tube and the conductor for closing the space therebetween, said seal cooperating with the glass cylinder and the dielectric tube member to provide a leakproof structure about the conductor, the seal being sufficiently plastic to relieve stresses in the sealed structure occasioned by reason of the different coefficients of expansion of the sealed elements while maintaining them integrally united.

4. A bushing comprising, in combination, a conductor, a dielectric tube member disposed in spaced relation about the conductor, a gasket of unplasticized polymerized methyl methacrylate disposed on the end of the dielectric tube, a glass cylinder having a coefficient of expansion different from that of the dielectric tube member disposed in spaced relation about the conductor to seat on the gasket, a bond of thermoplastic material comprising polymerized propyl methacrylate disposed between the gasket and each of the glass cylinder and the dielectric tube sealing them into an integral structure, means associated with the unsealed end of the glass cylinder and the conductor for closing the space therebetween, and means associated with the unsealed end of the dielectric tube and the conductor for closing the space therebetween, the bond cooperating with the gasket, glass cylinder and dielectric tube member to provide a leakproof structure about the conductor, the bond and gasket being sufficiently plastic to relieve stresses in the sealed structure occasioned by reason of the different coefficients of expansion of the sealed elements while maintaining them integrally united.

JAMES G. FORD.